(12) United States Patent
Meess

(10) Patent No.: US 10,703,083 B2
(45) Date of Patent: Jul. 7, 2020

(54) MULTI-TOOL SCHEDULING FOR COOPERATIVE MANUFACTURING

(71) Applicant: Autodesk, Inc., San Rafael, CA (US)

(72) Inventor: Gregory David Meess, Berkeley, CA (US)

(73) Assignee: Autodesk, Inc., San Rafael, CA (US)

(*) Notice: Subject to any disclaimer, the term of this patent is extended or adjusted under 35 U.S.C. 154(b) by 485 days.

(21) Appl. No.: 15/406,446

(22) Filed: Jan. 13, 2017

(65) Prior Publication Data

US 2018/0200965 A1 Jul. 19, 2018

(51) Int. Cl.
  *B33Y 50/02* (2015.01)
  *G05B 19/402* (2006.01)
  (Continued)

(52) U.S. Cl.
  CPC ............. *B33Y 50/02* (2014.12); *B25J 9/1682* (2013.01); *B29C 64/386* (2017.08);
  (Continued)

(58) Field of Classification Search
  CPC ............ B29C 67/0088; G05B 19/0426; G05B 19/402; G05B 2219/49023; B33Y 50/02
  See application file for complete search history.

(56) References Cited

U.S. PATENT DOCUMENTS 9,126,365 B1  9/2015 Mark et al.
9,555,545 B2  1/2017 Linnell et al.
(Continued)

FOREIGN PATENT DOCUMENTS

WO  WO 2004/045834  6/2004
WO  WO 2006/020685  2/2006
WO  WO 2017/044892  3/2017

OTHER PUBLICATIONS

Cashmere, 'RE: Erlang: choosing unique items from a list, using recursion'. Stack Overflow [online]. Mar. 13, 2013. Retrieved Jan. 5, 2019) URL <https://stackoverflow.com/questions/15391740/erlang-choosing-unique-items-from-a-list-using-recursion (Year: 2013).*

(Continued)

*Primary Examiner* — Robert E Fennema
*Assistant Examiner* — Shon G Foley
(74) *Attorney, Agent, or Firm* — Fish & Richardson P.C.

(57) ABSTRACT

Methods, systems, and apparatus, including medium-encoded computer program products, for synchronizing the manufacture of objects using two or more separate tools include, in at least one aspect, determining tasks to be performed in a shared build volume to manufacture a 3D object, assigning the tasks to respective queues, ordering the tasks within each queue of assigned tasks based on a spatial dimension extent, generating wait times within the queues in accordance with timing dependencies, identifying which of the queues of assigned tasks takes a most amount of time in accordance with temporal dimension extents and the wait times, creating at least one variant of the queues of assigned tasks, repeating the ordering, the adding, and the identifying to reduce a total time of manufacturing, and providing a finalized version of the queues of assigned tasks for conducting synchronized activities of manufacturing in the shared build volume.

24 Claims, 11 Drawing Sheets

(51) Int. Cl.
*B25J 9/16* (2006.01)
*B29C 64/386* (2017.01)
(52) U.S. Cl.
CPC .. *G05B 19/402* (2013.01); *G05B 2219/32265* (2013.01); *G05B 2219/39117* (2013.01)

(56) References Cited

U.S. PATENT DOCUMENTS

| | | |
|---|---|---|
| 9,701,018 B2 | 7/2017 | Linnell et al. |
| 2005/0065620 A1* | 3/2005 | Maenishi ........... H05K 13/0452 700/28 |
| 2009/0082891 A1* | 3/2009 | Tang .................... B29C 70/386 700/100 |
| 2010/0100883 A1* | 4/2010 | Booton ................ G06F 9/4881 718/103 |
| 2015/0096266 A1 | 4/2015 | Divine et al. |
| 2015/0148951 A1* | 5/2015 | Jeon .................... G05D 1/0219 700/248 |
| 2015/0231827 A1* | 8/2015 | Uzan .................. B29C 67/0085 425/375 |

OTHER PUBLICATIONS

Unknown Author, "Project Escher—Parallel Control for Additive Manufacturing," (Sep. 12, 2016) [online] (retrieved from http://projectescher.com/), 4 pages.

* cited by examiner

MULTI-TOOL SCHEDULING FOR COOPERATIVE MANUFACTURING

BACKGROUND

This specification relates to manufacturing of objects using two or more separate tools, such as additive manufacturing tools, in a shared build volume.

Assembly line manufacturing is a manufacturing process in which parts are added as the semi-finished manufacture moves from workstation to workstation. Different tools that perform different functions are stationed in different workstations along an assembly line. Each manufacture travels sequentially from one workstation to another and from one tool to the next to complete the assembly process.

One tool can be an additive manufacturing tool. Additive manufacturing (AM), also known as solid free form fabrication or three-dimensional (3D) printing, refers to any manufacturing process where 3D objects are built up from raw material (generally powders, liquids, suspensions, or molten solids) in a series of two-dimensional layers or cross-sections. An example of additive manufacturing is Fused Filament Fabrication (FFF). Traditionally, FFF uses a single print head to lay down material, such as a plastic filament or metal wire that is unwound from a coil, in layers to produce a manufacture. Recently, at least one AM system has been developed that allows two or more 3D printer apparatus to work in a coordinated fashion to manufacture objects in a shared 3D build volume.

SUMMARY

This specification describes technologies relating to manufacturing of objects using two or more separate tools, such as an additive manufacturing tool and a subtractive manufacturing tool, in a shared build volume.

In general, one or more aspects of the subject matter described in this specification can be embodied in one or more methods that include determining a set of multiple tasks to be performed by two or more robots in a shared build volume to manufacture a three-dimensional (3D) object in the shared build volume, wherein each of the tasks in the set has a spatial dimension extent and a temporal dimension extent; assigning the tasks to respective queues of respective ones of the two or more robots; ordering the tasks within each queue of assigned tasks based on the spatial dimension extent; generating wait times within the queues of assigned tasks in accordance with timing dependencies among tasks in the queues of assigned tasks to avoid spatial overlap; identifying which of the queues of assigned tasks takes a most amount of time from among all of the respective queues of assigned tasks in accordance with the temporal dimension extents and the wait times; creating at least one variant of the queues of assigned tasks by moving a task in the identified queue, or a task on which a task in the identified queue depends, to another of the queues of assigned tasks; repeating the ordering, the adding, and the identifying to reduce a total time of manufacturing; and providing a finalized version of the queues of assigned tasks for conducting synchronized activities of the two or more robots when manufacturing the 3D object in the shared build volume.

The two or more robots can include 3D printer robots. In some cases, determining the set of multiple tasks includes: obtaining a layer of a 3D model of the 3D object; identifying disconnected regions of the layer; and splitting at least one of the disconnected regions into smaller regions based on a spatial dimension of the at least one of the disconnected regions; wherein each of the tasks corresponds to manufacture of one of the smaller regions or an un-split one of the disconnected regions. In some cases, determining the set of multiple tasks includes: obtaining tool path specifications for a layer of a 3D model of the 3D object; identifying at least one of the tool path specifications that defines a tool path that spans a substantial portion of the shared build volume; splitting the at least one of the tool path specifications into smaller tool path specifications; wherein each of the tasks corresponds to one of the obtained tool path specifications or one of the smaller tool path specifications.

In some implementations, determining the set of multiple tasks includes, for each of the tasks: finding minimum and maximum locations for manufacture of a portion of the 3D object represented by the task; and adding a buffer to the minimum and maximum locations in accordance with a largest one of the robots that can carry out the task. Further, assigning the tasks can include: sorting the tasks by average values of their spatial dimension extents; and dividing the sorted tasks among the queues based on a number of the two or more robots and sums of the temporal dimension extents for the sorted tasks.

Ordering the tasks within each queue of assigned tasks can include: sorting the tasks included in the queue for a leftmost robot of the two or more robots by maximum values of their spatial dimension extents; and sorting the tasks included in the queue for a rightmost robot of the two or more robots by minimum values of their spatial dimension extents. Further, in some cases, the method includes determining the timing dependencies among the tasks in the queues of assigned tasks by beginning with tasks assigned to the rightmost robot and proceeding in sequence through the queues of assigned tasks for the two or more robots, ending with tasks assigned to the leftmost robot.

Generating the wait times within the queues of assigned tasks can include checking an end time of a temporal dimension extent for a first task in a first of the queues of assigned tasks when a spatial dimension extent of the first task overlaps with a spatial dimension extent of a second task in a second of the queues of assigned tasks. Creating the at least one variant can include: moving a final task from the queue of assigned tasks that takes the most amount of time to a queue of assigned tasks for a next robot over in a positive direction of the spatial dimension; and moving a root task in a dependency tree, which includes the final task, to a queue of assigned tasks for a next robot over in a negative direction of the spatial dimension.

The creating and the repeating can be performed by a recursive program, which can maintain a global list of attempted task assignment solutions and skip a recursive call for any variant that is already included in the global list of attempted task assignment solutions. The methods described can also be implemented as operations performed by one or more hardware processors of one or more computing devices, in appropriate systems and apparatus, in accordance with programming instructions encoded in a non-transitory computer-readable medium.

According to another aspect, a system includes: two or more robots configured and arranged to perform manufacturing operations in a shared build volume; a non-transitory storage medium having instructions of a manufacturing conductor program stored thereon; and one or more hardware processors configured to run the instructions of the manufacturing conductor program to determine a set of multiple tasks to be performed by the two or more robots in the shared build volume to manufacture a three-dimensional (3D) object in the shared build volume, wherein each of the tasks in the set has a spatial dimension extent and a temporal dimension extent, assign the tasks to respective queues of respective ones of the two or more robots, order the tasks within each queue of assigned tasks based on the spatial dimension extent, generate wait times within the queues of assigned tasks in accordance with timing dependencies among tasks in the queues of assigned tasks to avoid spatial overlap, identify which of the queues of assigned tasks takes a most amount of time from among all of the respective queues of assigned tasks in accordance with the temporal dimension extents and the wait times, create at least one variant of the queues of assigned tasks by moving a task in the identified queue, or a task on which a task in the identified queue depends, to another of the queues of assigned tasks, repeat the ordering of tasks, the adding of wait times, and the identifying of a queue to reduce a total time of manufacturing, and provide a finalized version of the queues of assigned tasks for conducting synchronized activities of the two or more robots when manufacturing the 3D object in the shared build volume.

The two or more robots can include two or more additive manufacturing tools. The one or more hardware processors can be configured to run the instructions of the manufacturing conductor program to provide the finalized version of the queues of assigned tasks by outputting tool path specifications to cause the two or more additive manufacturing tools to additively manufacture the 3D object in the shared build volume without collision among the two or more robots.

Particular embodiments of the subject matter described in this specification can be implemented to realize one or more of the following advantages. The manufacturing activities of multiple robots, which operate within a shared three-dimensional (3D) build volume, can be coordinated to avoid collisions and reduce manufacturing time. Different robots can be assigned different manufacturing tasks, such as 3D printing, milling, assembly, hot staking, part removal or other manufacturing processes, and the different manufacturing tasks can be reassigned among the robots to reduce manufacturing time by reducing time spent by one robot waiting for another robot to complete a manufacturing task. For FFF 3D printing, by splitting the layer into regions, some of the warping effects of thermal contraction can be mitigated. Moreover, in some implementations, a more granular mixing of processes within fabrication can be achieved, such as doing a partial 3D print of a part, followed by a subtractive manufacturing robot doing one or more steps, followed by a return to 3D printing of the part, thus allowing a robot with a subtractive manufacturing tool head to access areas that are otherwise inaccessible in the finished part.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
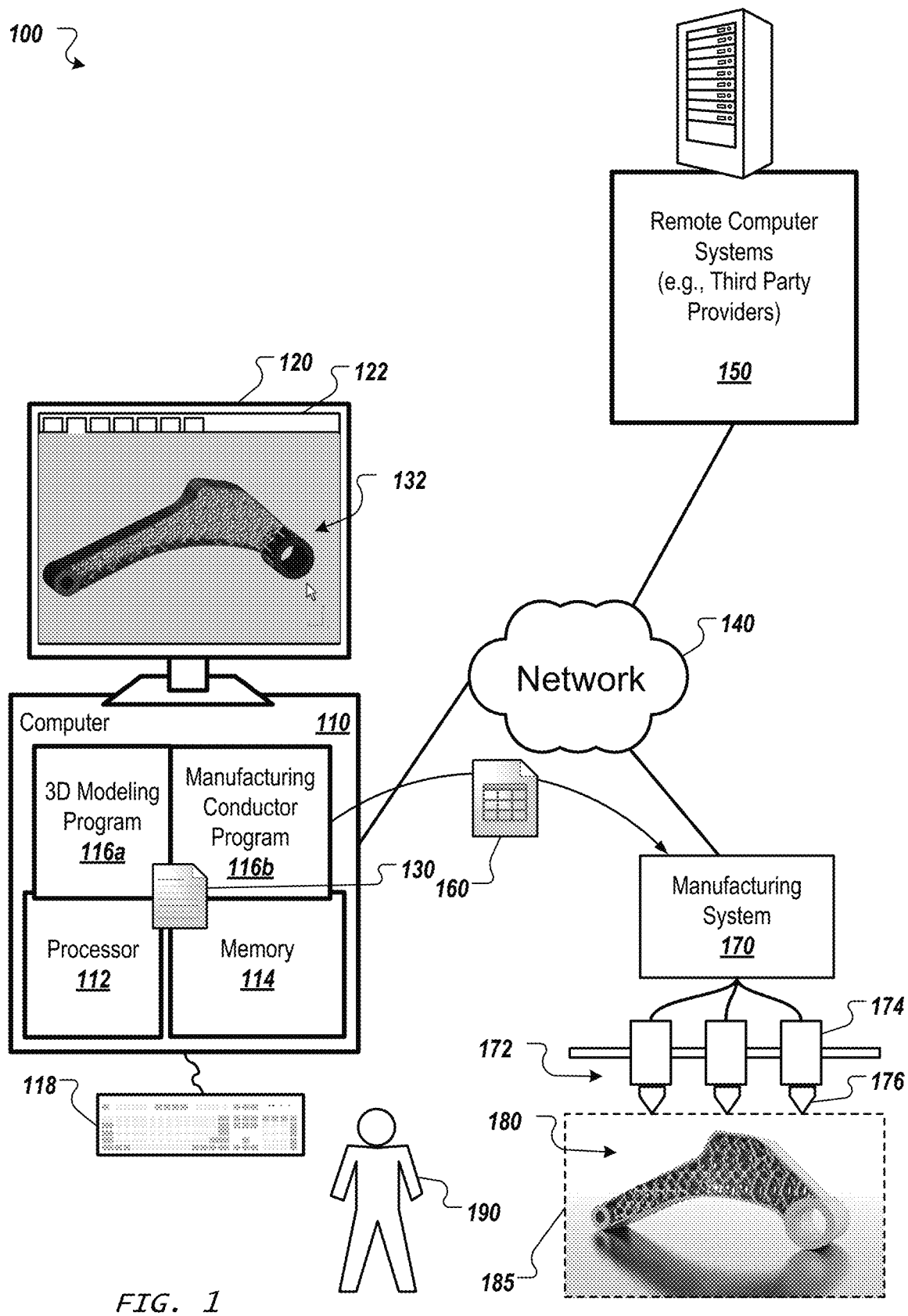
FIG. 1 shows an example of a system to design and manufacture objects using separate tools whose activities are conducted in a shared build volume.

FIG. 1 shows an example of a system 100 to design and manufacture objects using separate tools whose activities are conducted in a shared build volume. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs can include a 3D modeling program 116a, which can run locally on computer 110, remotely on a computer of one or more remote computer systems 150 (e.g., one or more third party providers' one or more server systems accessible by the computer 110 via the network 140), or both. The 3D modeling program 116a presents a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer.

A user 190 can interact with the 3D modeling program 116a to create a 3D model 132. This can be done using known graphical user interface tools. In the example shown, the 3D model 132 is a bracket that includes an internal lattice structure to improve strength and reduce weight, but such a structure is not required. Rather, various suitable forms of 3D model 132 can be created to represent a wide variety of 3D objects that can be manufactured, such as by using additive manufacturing systems and techniques. In some implementations, the programs that run on the processor 112 include a slicer program, a manufacturing conductor program 116b, a tool path generation program, etc. Such programs can be separate from the 3D modeling program 116a or integrated into the 3D modeling program 116a or into each other. Thus, a "program" as referenced herein can be a procedure within another program. Moreover, in some implementations, such program(s) run on a processor in a manufacturing system 170, which can also include processor(s) and memory and constitute a computer, similar to computer 110.

In various implementations, the 3D modeling program 116a is programmed to provide various user interface elements to enable the user 190 to design the 3D model 132, specify materials and loading cases, perform simulation, etc. Once the user 190 is satisfied with the model 132, the 3D model 132 is stored as a document 130 and/or used to generate another representation of the model (e.g., an .STL file for additive manufacturing). This can be done upon request by the user 190, or in light of the user's request for another action, such as sending the 3D model 132 to the manufacturing system 170, which can be directly connected to the computer 110, e.g., integrated with the computer 110, or connected via the network 140, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files. In any case, the 3D modeling program 116a is used to create the 3D model 132, and a manufacturing conductor program 116b is used to assist in generating a document 160 (of an appropriate format) for use by the manufacturing system 170 to synchronize its manufacturing activities to create a 3D object 180 corresponding to the 3D model 132.

The manufacturing system 170 includes two or more robots 172 that operate tools in a shared build volume 185 to create the 3D object 180, and the document 160 provides instructions to coordinate the activities of the robots 172 (e.g., three, four, five, six, seven, or more robots that work together in the build volume 185). In some implementations, the tools employ one or more additive manufacturing techniques, such as granular techniques (e.g., Selective Laser Sintering (SLS) and Direct Metal Laser Sintering (DMLS)) and extrusion techniques (e.g., Fused Filament Fabrication (FFF)). In some implementations, the tools employ subtractive manufacturing techniques or other computer aided manufacturing techniques, potentially in combination with additive manufacturing techniques. Note that although shown in FIG. 1 as a simple linear system, the robots 172 perform activities in more than one dimension (e.g., each robot 172 can have three degrees of freedom for its movement, where at least one of those degrees of freedom creates overlap with another robot 172 in the build volume 185).

In addition, in some implementations, one or more of the robots 172 include a chassis 174 and a tool 176 that can be disconnected and the reconnected with each other. Thus, in addition to the robots 172 working together in a common space 185 to create the 3D object 180, the robots 172 can change tools (e.g., change between an additive manufacturing tool and a subtractive manufacturing tool) in the course of cooperating to build the 3D object 180. Thus, various types of manufacturing systems 170 can be employed. For additional implementation details for a manufacturing system 170, see PCT/US2016/051163, filed Sep. 9, 2016, and entitled "MULTI-TOOL MANUFACTURING SYSTEM", which application is hereby incorporated by reference.

In any case, the manufacturing conductor program 116b (which operates at computer 110, at the remote computer system 150, at the manufacturing system 170, or at a combination of these) coordinates the activities of the different robots 172 so they can simultaneously fabricate the 3D object 180. Each layer of the 3D model 132 can be divided into tasks that can be divvied up between the robots 172. The manufacturing conductor program 116b operates to prevent interference among the robots 172 while the manufacturing proceeds, e.g., a dependency tree can be constructed based on which tasks would cause collision between the robots 172. For each task to be completed, the manufacturing conductor program 116b checks to see if a robot 172 can start the next task or whether the robot needs to wait so as to avoid interfering with another robot in the system. This parallelization of activities by the robots 172 can be orchestrated at a fine grained level. For example, each layer can be split into small regions, and the regions can be assigned to robots and ordered so as to minimize the amount of time that the robots 172 must spend waiting for each other to get out of the way.

Figure 2:
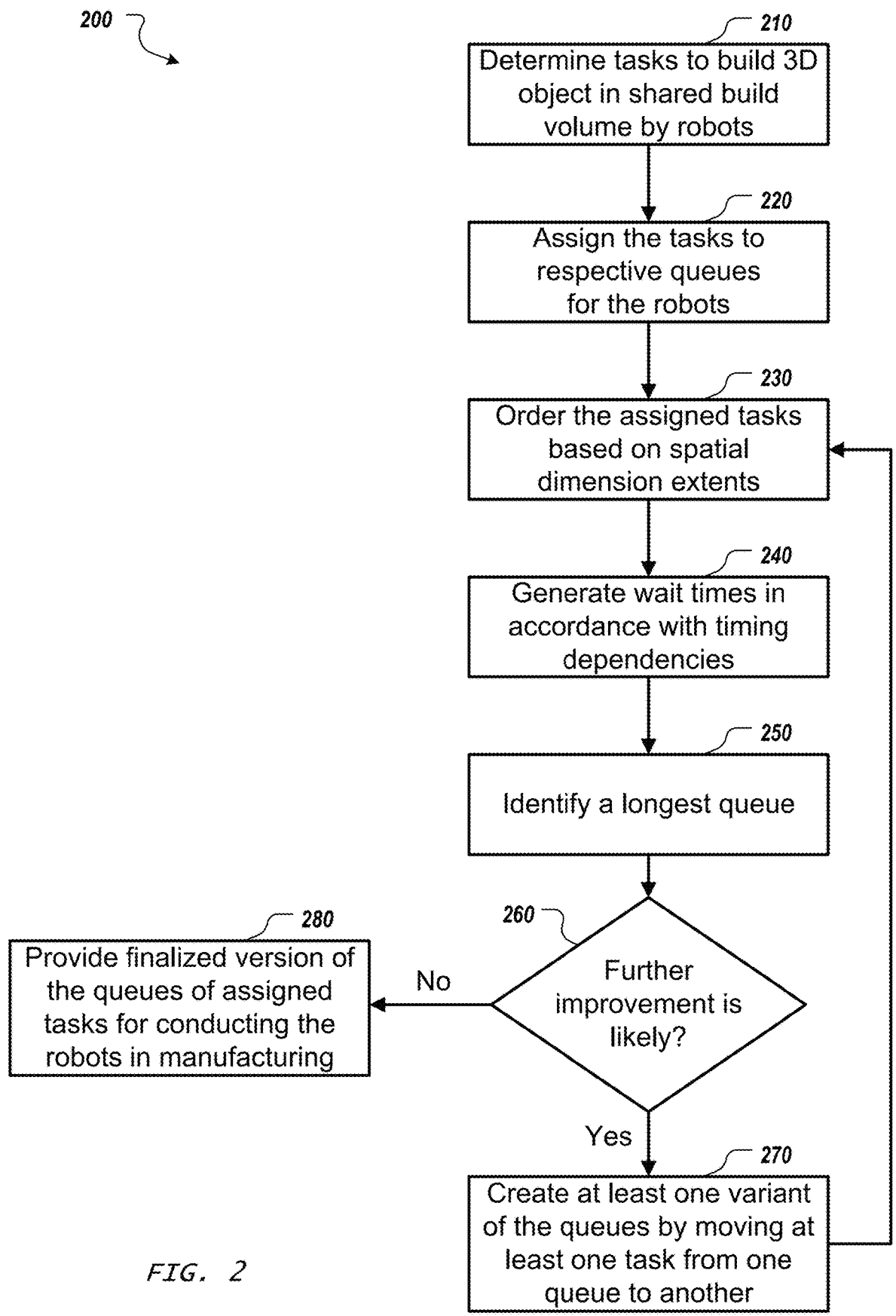
FIG. 2 is a flowchart showing an example of a process to synchronize manufacturing activities of two or more robots in a shared build volume.

FIG. 2 shows a flowchart of an example of a process 200 to synchronize manufacturing activities of two or more robots in a shared build volume. Initially, a set of multiple tasks to be performed by robots in a shared build volume is determined 210. The tasks in this set are portions of the manufacturing process to build the 3D object in the shared build volume. This set of tasks can be determined in various manners, such as described in further detail below. In some implementations, the tasks correspond to regions in a layer of the 3D model that will be used to manufacture a layer of the 3D object. In some implementations, the tasks correspond to tool path specifications. In any case, once the full set of tasks is determined, each task in the set will have a spatial dimension extent (the space in at least one dimension traversed by a robot to perform the task) and a temporal dimension extent (the total time taken by a robot to perform the task, including any needed tool change).

The tasks in the set of tasks are then assigned 220 to respective queues of respective ones of the robots. In some implementations, this initial assignment of tasks is random. In some implementations, this initial assignment of tasks is based on a spatial dimension of the task. For example, in some implementations, the assignment 220 of tasks includes sorting the tasks by average values of their spatial dimension extents, and dividing the sorted tasks among the queues based on a number of the two or more robots and sums of the temporal dimension extents for the sorted tasks, e.g., with the goal being to get the sums of task durations to be similar for the robots in the initial assignment of tasks.

In general, the initial assignment should divide the tasks equally among the robots that can perform the respective tasks. Note that in some implementations, certain tasks can only be performed by certain robots, and such limitations can be taken into consideration. Nonetheless, there will be at least some tasks that can be performed by more than one robot (potentially with a tool change), and the rest of this disclosure will focus on such tasks that can be freely reassigned among two or more robots.

The assigned tasks within each queue of assigned tasks are ordered 230 based on the spatial dimension extent. In some implementations, the tasks included in the queue for a leftmost robot of the two or more robots are sorted by maximum values of their spatial dimension extents, and the tasks included in the queue for a rightmost robot of the two or more robots are sorted by minimum values of their spatial dimension extents. When there are three or more robots, the intermediate robot queues (those queues for the robots between the leftmost and rightmost robots) can be sorted by average values of their spatial dimension extents, or sorted by other values derived from their spatial dimension extents. In addition, it should be noted that robots are referred to as "leftmost" and "rightmost" in the context of a single dimension (with moving left corresponding to smaller numbers in the coordinate system and moving right corresponding to larger numbers in the coordinate system), but in some implementations, the spatial dimension extent covers more than one spatial dimension, and so the sorting can likewise be based on more than one spatial dimension.

Wait times are generated 240 between tasks in the queues in accordance with timing dependencies among tasks in the queues of assigned tasks to avoid spatial overlap. In some implementations, this includes checking an end time of a temporal dimension extent for a first task in a first queue when a spatial dimension extent of the first task overlaps with a spatial dimension extent of a second task in a second queue. Each task in a queue for a given robot is presumed to start immediately after (subject to any time buffer) the preceding task in that queue, unless doing so would risk a collision with another task in a queue for another robot. Thus, collision cross-checks are made for the tasks in the robot task queues, and wait times are created between tasks in each queue, as needed. In some implementations, this involves generating dependency trees for the tasks in the queues, and the wait times are generated implicitly by the interrelation of the queues with the dependency trees, which can span the queues.

Once all necessary wait times are generated, one of the queues of assigned tasks, which takes a most amount of time from among all of the respective queues of assigned tasks, is identified 250 in accordance with the temporal dimension extents and the wait times. The total time needed to complete the tasks in a robot task queue is equal to the sum of the temporal dimension extents of the tasks in the queue plus any added wait times. Since the tasks in the separate queues are performed in parallel, the queue with largest total time dictates the time needed to completely fabricate the current layer of the object. Thus, the identified most-amount-of-time queue corresponds to the time needed to manufacture the current layer. In some implementations, the longest queue is identified by finding the dependency tree with a last finishing task.

A check can be made 260 regarding whether improvement in the task assignments is likely. In some implementations, the check 260 assesses the total time for manufacture in relation to the amount of manufacturing activities needed for the current layer. In some implementations, a potential improvement is presumed likely in the first pass through the procedural loop, and the check 260 only becomes meaningful after at least one variant of the tasks assignments is tried. In some implementations, the check 260 compares the total time achieved with the current set of task assignments to queues with the best total time achieved by a previous set of task assignments to queues, and terminates trying new variants once no improvement (or significant improvement) is achieved after a certain number of variants have been tried.

When further improvement is still likely, at least one variant of the queues of assigned tasks is created 270 by moving a task from one queue to another so as to reduce the length of the queue of assigned tasks that takes the most amount of time. In some implementations, only a single task is moved 270 per loop. In some implementations, more than one task can be move moved 270 among the queues. In any case, once a variant of task assignments has been created 270, the ordering 230, generating 240, and identifying 250 are repeated to reduce a total time needed to manufacture the 3D object.

Once it is determined 260 that further improvement is unlikely, a finalized version of the queues of assigned tasks for conducting synchronized activities of the two or more robots when manufacturing the 3D object in the shared build volume is provided 280. This can include outputting the task queues, the dependency trees, or both to another program or saving the task queues, the dependency trees, or both to memory for later use. In some implementations, the providing 280 includes generating tool path data from the tasks to operate the robots and storing or transmitting this data. In some implementations, the providing 280 includes sending tool path data to the robots to cause the robots to manufacture the 3D object.

FIGS. 3A-3E show examples of processes to determine a set of multiple tasks to be performed by robots in a shared build volume. It should be noted that splitting or subdividing a layer can be accomplished many ways. The basic idea is that rather than fabricate an entire cross section of a part at once, the layer is broken into smaller areas that can be fabricated independently. This approach is valid for additive, subtractive, and other fabrication methods that do not require acting on the entire part simultaneously.

Figure 3A:
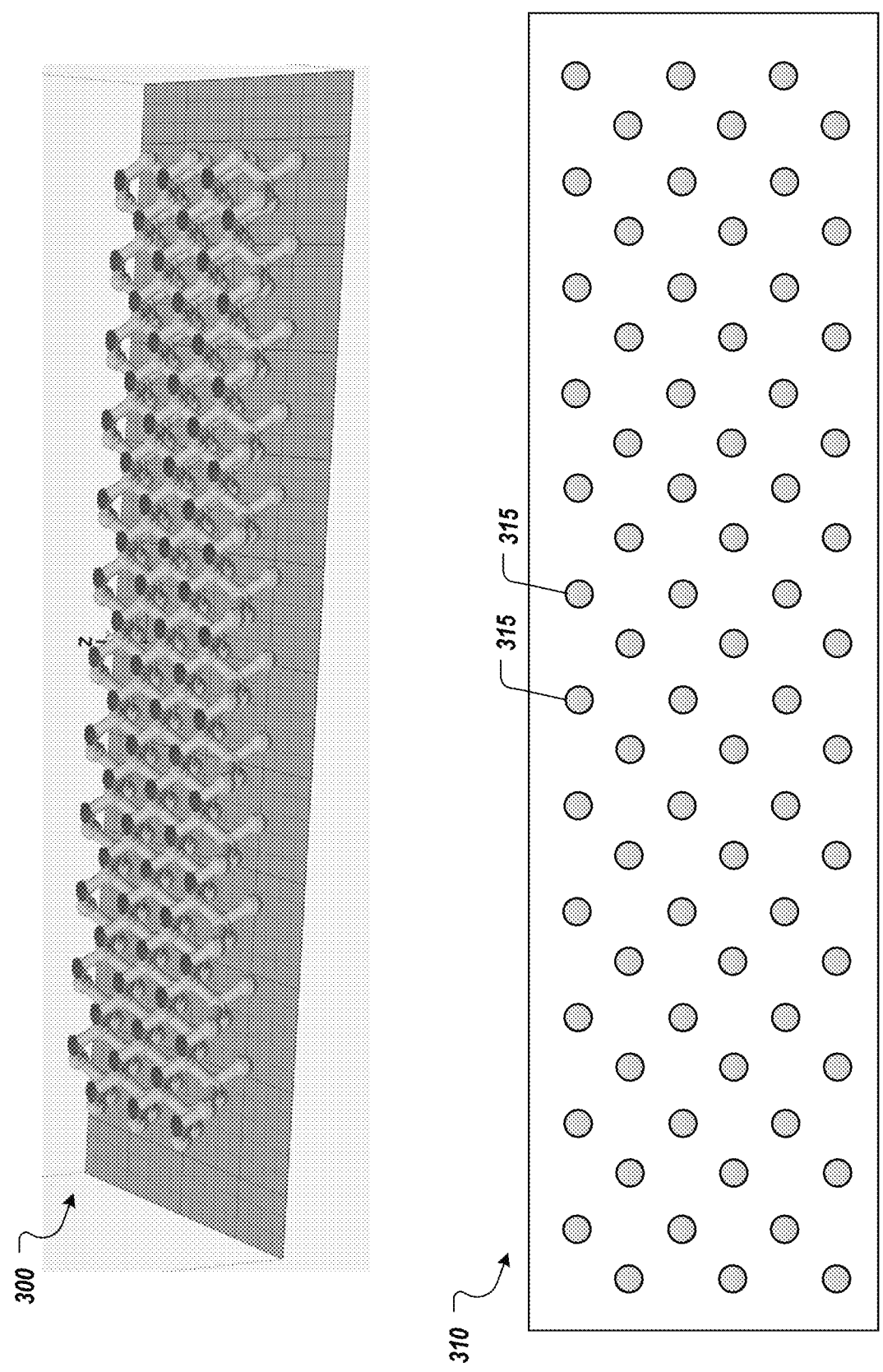
FIGS. 3A-3E are diagrams that graphically show examples of processes to determine a set of multiple tasks to be performed by robots in a shared build volume.

For many geometries, such as the lattice within 3D model 132, a slice through the model will yield many small disconnected regions that are already adequate inputs for the sequencing of tasks to build these disconnected regions, without further subdivision. FIG. 3A shows a perspective view 300 of a lattice portion of a 3D model and also a layer 310 of this model, which is a single slice through the 3D model (viewed from above, looking along the Z axis with respect to the build platform). As shown, the slice through this 3D model necessarily generates discrete, disconnected regions 315, which are small relative to the overall object to be manufactured. Thus, these regions 315 are ready to be treated as separate tasks that can be freely assigned (and reassigned) to respective robots.

In some implementations, as each slice of the 3D model is obtained, e.g., received as output data from a slicer program by the conductor program, the discrete regions are identified in the slice, and the size of each discrete region is compared with a threshold to determine whether that region should be subdivided. For example, in a system where the robots parallelize their activities in only one dimension, the size of the region in that dimension can be checked to see if it is a sizable fraction of the shared build volume in that dimension (e.g., over a fourth the X dimension size of the build platform in a system with three robots). In some implementations, the subdivision threshold is based on the dimension in the shared axis of the robots, e.g., if the region exceeds two and a half times the minimum robot spacing, or if the region extents are greater than 150% of the tightest robot spacing, the region is subdivided (note that this approach can be applied to two axis parallelization as well). In some implementations, an absolute limit can be used, e.g., if the region extents are greater than 100 mm, subdivide. In any case, the subdivision can occur, as needed, on a layer by layer basis.

Figure 3B:
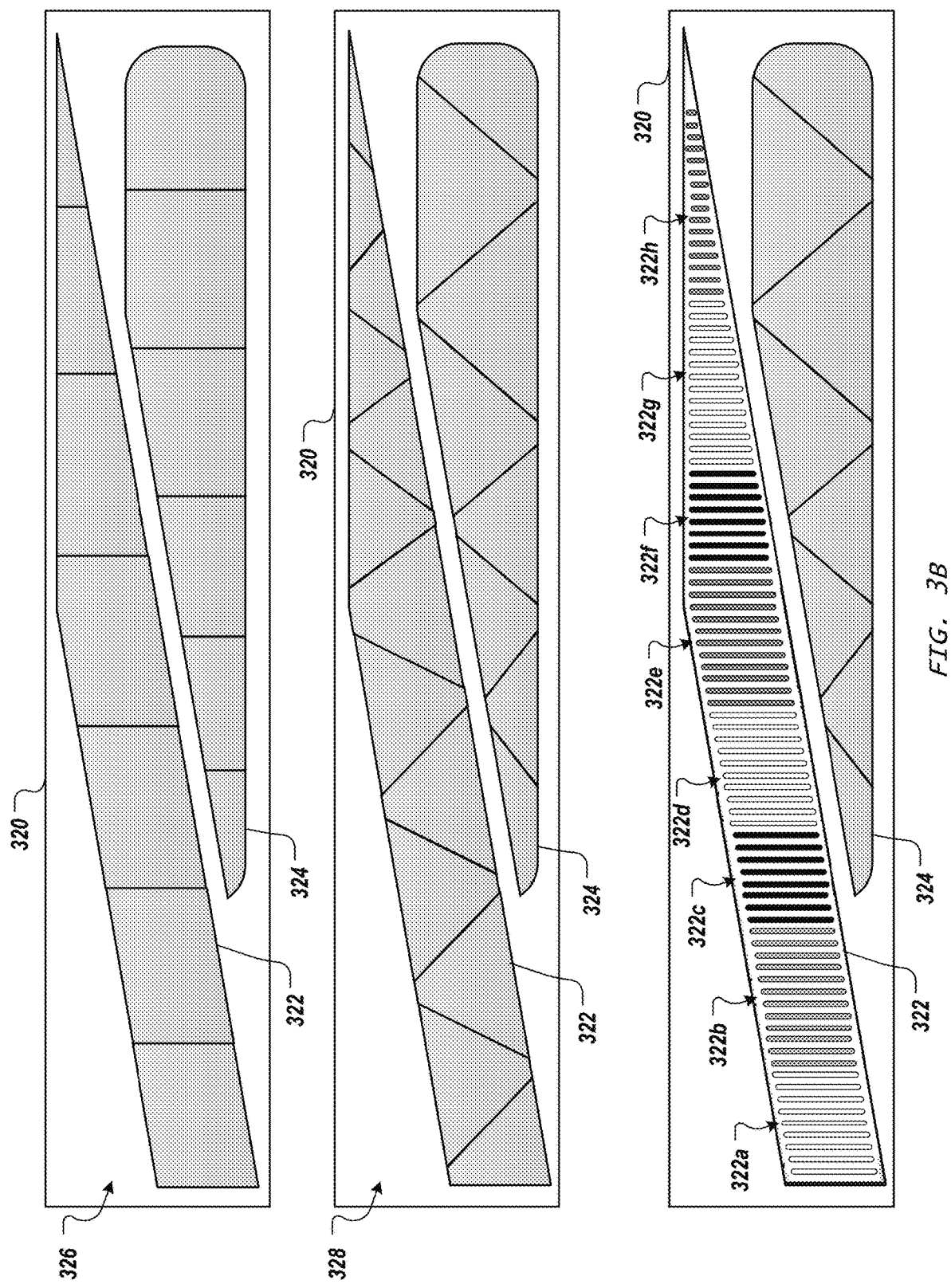

When it is determined that a region should be subdivided, the splitting of the region into smaller regions can be performed in various ways, but in general, the splitting is based on a spatial dimension of the disconnected region(s) in relation to a corresponding dimension of the shared build volume. FIG. 3B shows various approaches to splitting tasks into new, smaller tasks. A layer 320 of another 3D model includes a first region 322 and a second region 324 that might normally be treated as two tasks (e.g., in a single tool FFF 3D printer, the 3D printer would process a first tool path specification to build region 322 in layer 320, and then process a second tool path specification to build region 324 in layer 320). However, rather than do this, the conductor program decides to split these two regions into pieces using a subdivision technique 326. In subdivision technique 326, the regions 322 and 324 of layer 320 are each split along lines perpendicular to an axis shared by the robots (the X axis in this example, resulting in seven smaller regions for original region 322 and six smaller regions for original region 324). Note that, as shown, if there is more than one region in the original layer, their split lines do not have to be collinear.

Once these smaller regions are created in the layer 320, a tool path specification can be created for each, such as directly by the conductor program, or by calling another program that generates toolpaths for each one of the smaller regions as if it was its own layer. The locations of the splits can be determined through simple equal spacing, or through a more advanced algorithm that optimizes where they are placed. Such an algorithm can use any suitable pattern that breaks the region in the layer into smaller regions. Vornoi type patterns or other structurally optimized subdivisions can be used. In some implementations, a regular tessellating shape (e.g., hexagonal, triangular, or square tube cross sections) is used to break the region into smaller regions, or the region can be divided in to cells of various shapes and sizes to provide smaller regions well suited to parallelization. FIG. 3B shows a subdivision technique 328 in which a set of angled splits are used. Thus, the splits need not be aligned with a specific axis. In this example of subdivision technique 328, thirteen smaller regions are generated for original region 322, and eight smaller regions are generated for original region 324.

In addition, in some implementations, the tasks to be split into smaller tasks correspond to tool path specifications rather than regions of a slice of a 3D model. For example, rather than break a region into smaller regions before generating toolpaths, toolpaths can be generated for the layer or a large region, and then the toolpaths can be divided into groups. In the bottom example in FIG. 3B, toolpaths are shown filling the interior of the region 322, where these toolpaths are lumped into groups 322a, 322b, 322c, 322d, 322e, 322f, 322g, 322h (demarcated by white, gray, and black) to create sets of toolpaths that have smaller X extents. Thus, in some implementations, tool path specifications for a layer are obtained (e.g., received as output data from a tool path generation program by the conductor program), tool path specification that define a tool path that spans a substantial portion of the shared build volume (e.g., compared with a threshold, as described above in connection with FIG. 3A) are identified, and such tool path specifications are split into smaller tool path specifications.

Note that the various techniques for subdivision can be mixed and matched in some implementations. For example, a single layer may have regions that don't need additional splitting and also one region that is divided with Cartesian splits. As another example, different regions of a single layer can be divided using different spitting techniques. In some implementations, once a slicer program has generated the polygons for a layer at a specified height, those polygons are split into smaller polygons using a common splitting technique. However, other approaches are also possible. For example, rather than doing the subdivision as part of the model slicing, or after each slice is generated, the subdivision can be performed in the mesh domain of the 3D model itself, before slicing.

In addition, determining the set of tasks can include determining a spatial dimension extent and a temporal dimension extent for each task. Determining a spatial dimension extent for a task can involve finding minimum and maximum locations for manufacture of a portion of the 3D object represented by the task, and adding a buffer to the minimum and maximum locations in accordance with a largest one of the robots that can carry out the task. In some implementations, the spatial dimension extent resides in only a single dimension. In other implementations, the spatial dimension extent resides in more than one dimension.

Figure 3C:
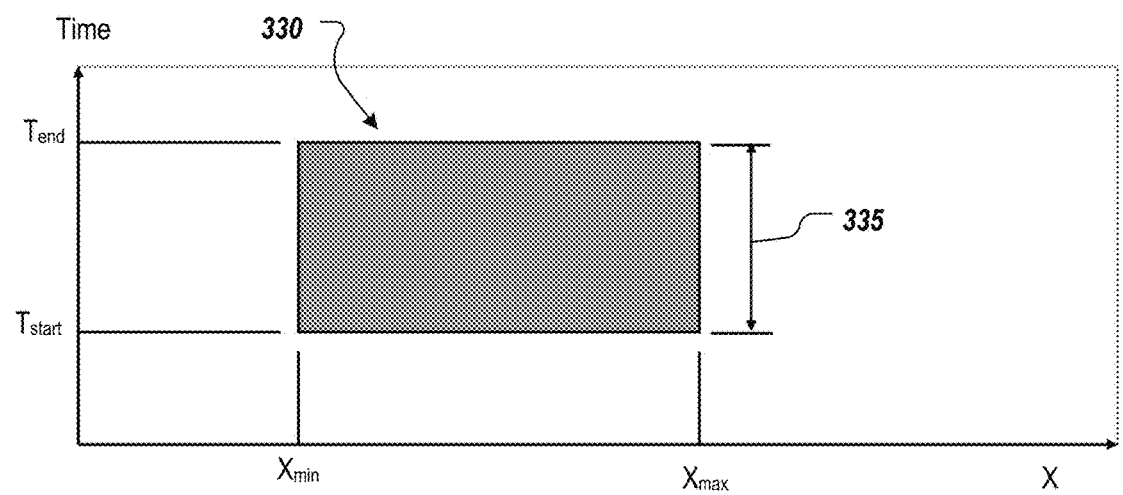

FIG. 3C shows an example of a process to determine a spatial dimension extent and a temporal dimension extent for a task 330 in a system with only one dimension of overlap among the robots. As shown in FIG. 3C, this example of an algorithm to assign and sequence regions works in the X versus Time domain. For a 1×N configuration, the Y coordinates are irrelevant since no robot will crash into another robot just by moving in the Y dimension (because this example only has overlap in the X dimension). What matters are the extents in X of each region/task, and how long it takes to complete. In the visualizations of the algorithm that follow, the task of fabricating a region is represented by a rectangular block. The left and right sides of the block represent the minimum and maximum locations of the tool head while fabricating the region. The height of the block represents the duration of the task. The bottom edge of the block represents the start time of the task, while the top edge is the time the task finishes. Thus, task 330 has a spatial dimension extent that goes from $X_{min}$ to $X_{max}$ and a temporal dimension extent 335 that goes from $T_{start}$ to $T_{end}$.

Figure 3D:
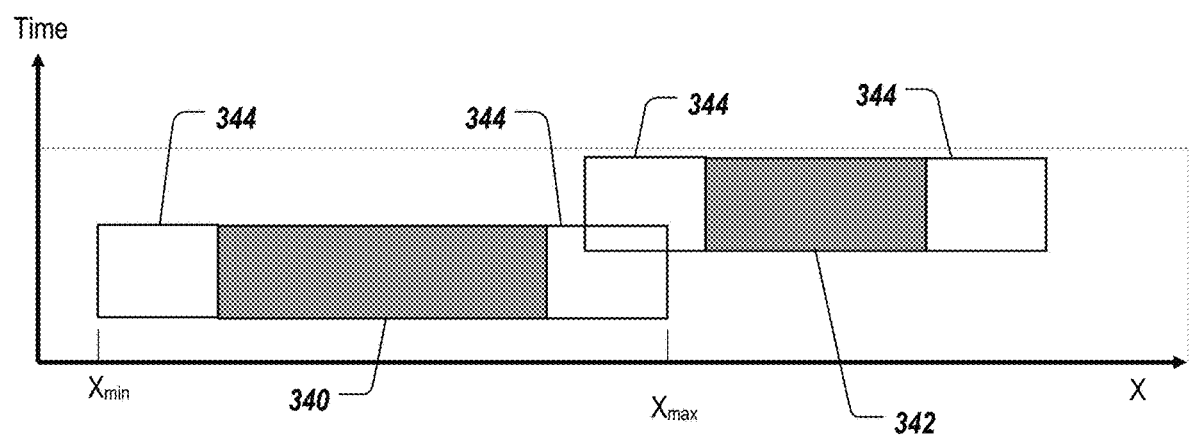
Figure 3E:
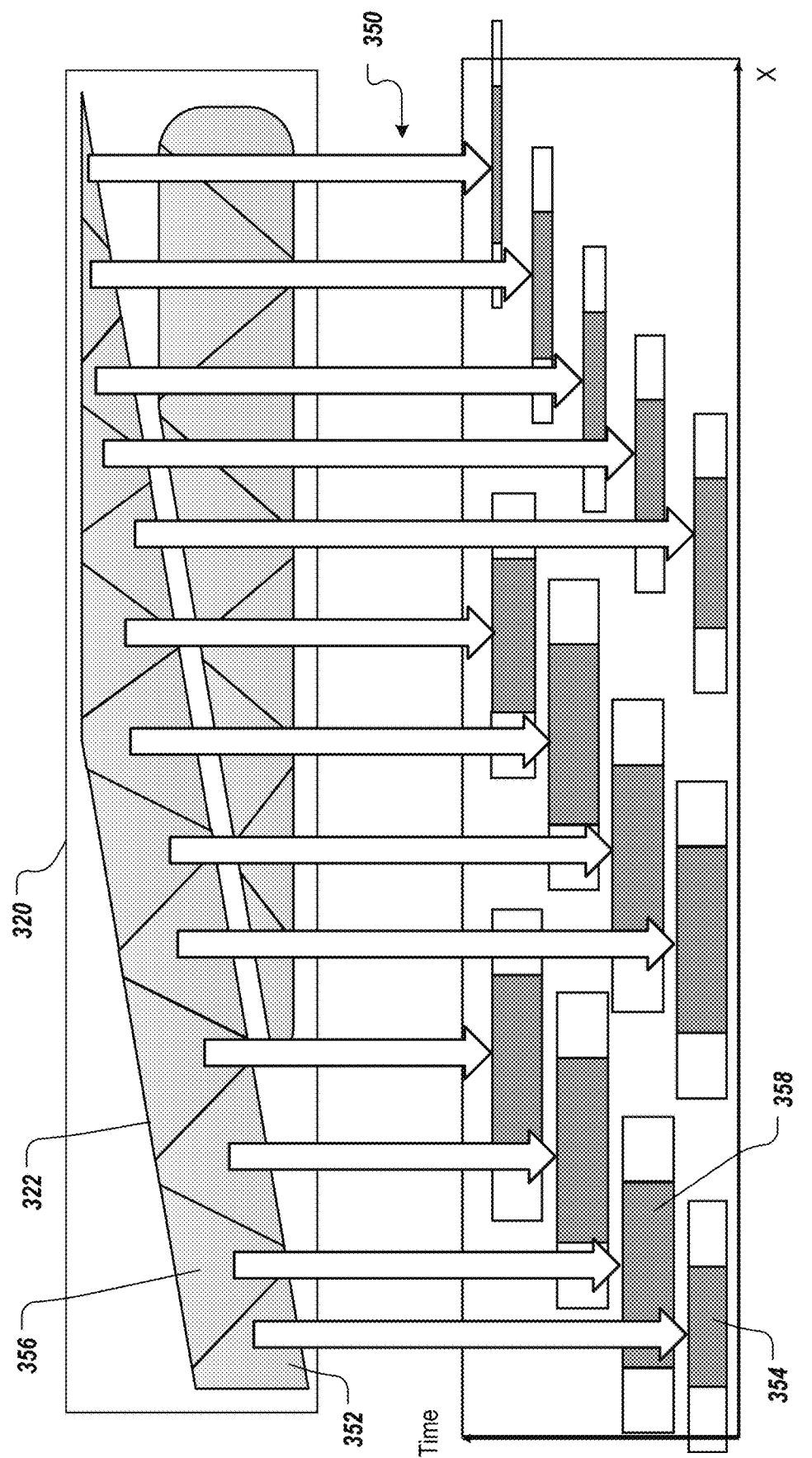

In addition, buffers can be added to the spatial dimension extent and the temporal dimension extent of a task. A time buffer can be added when the robot is likely to need to perform some other movement or operation as part of its transition from one task to another. A space buffer can be added to account for moving parts of the robot that extend beyond the tool head where the fabrication of the 3D object occurs. FIG. 3D shows an example of adding a buffer to spatial extents. A first task 340 does not initially conflict with a second task 342. However, once a buffer 344 is added on each side of each task 340 and 342, then the increased size of the tasks creates a potential conflict. If task 340 is assigned to a first robot, and task 342 is assigned to a second robot, the overlap in the tasks (after the addition of the buffers) shows that there is a risk of collision between these two robots.

In some implementations, a single buffer size is used. For example, in some implementations, each robot has a fixed width centered around the tool head, and thus the extents of the robot travel extend beyond the limits of the region size. For example, if the robot width is 100 mm, and the maximum x-position of the tool head in a task is at 450 mm, the right edge of the robot will be at 500 mm (plus or minus 0-50 mm, depending on the position of the tool head within the width of the robot). In order to avoid collisions, the tool heads of the robots performing tasks must stay at least one robot width apart at all times. Because of this, when the tasks are mapped into X versus Time space, a buffer of half the robot width is added on each side (for a system where each tool head is in the center of the robot). Note that other implementations can employ different buffer sizes, depending on the robot configurations, and more than one buffer can be used for different tasks (e.g., the buffer size can be set based on the type of robot needed to carry at a particular type of task).

Once spatial buffers have been added to all the tasks, the tasks can be processed in the X versus Time space. This is shown visually in FIG. 3E, where the region 322 in layer 320, which has been split using subdivision technique 328, has its regions mapped 350 to tasks in the X versus Time space. Thus, a region 352 is mapped 350 to a task 354, and a region 356 is mapped 350 to a task 358. At this point, the vertical position of each task on the Time axis is not relevant, but the horizontal position on the X axis is. Each task has a height that corresponds to the time needed to fabricate the corresponding region, and each task includes a spatial dimension extent that extends the left and right edge from the size of the corresponding region in the layer 320.

Figure 4A:
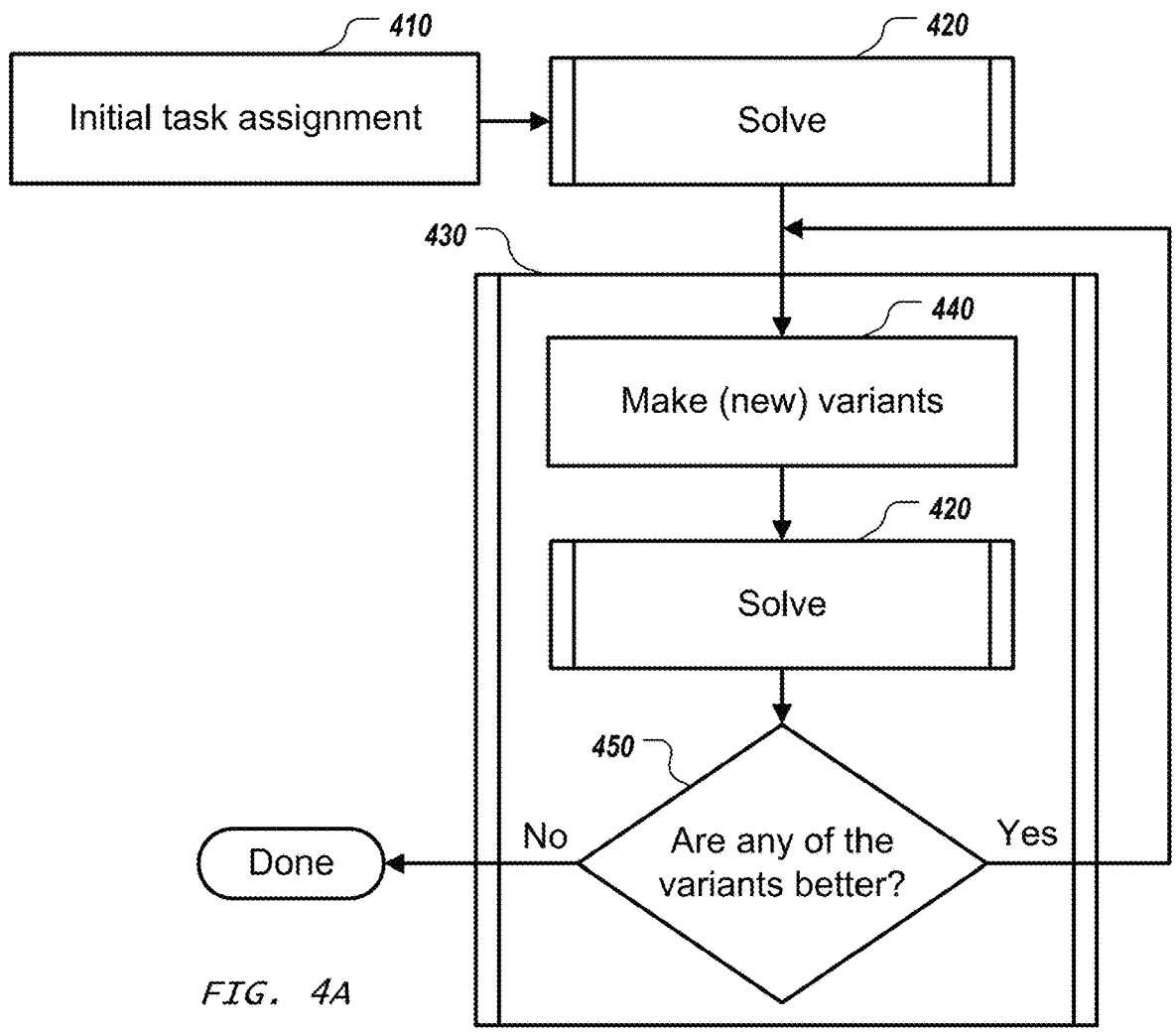
FIGS. 4A-4B are flowcharts showing another example of a process to synchronize manufacturing activities of two or more robots in a shared build volume.
Figure 4B:
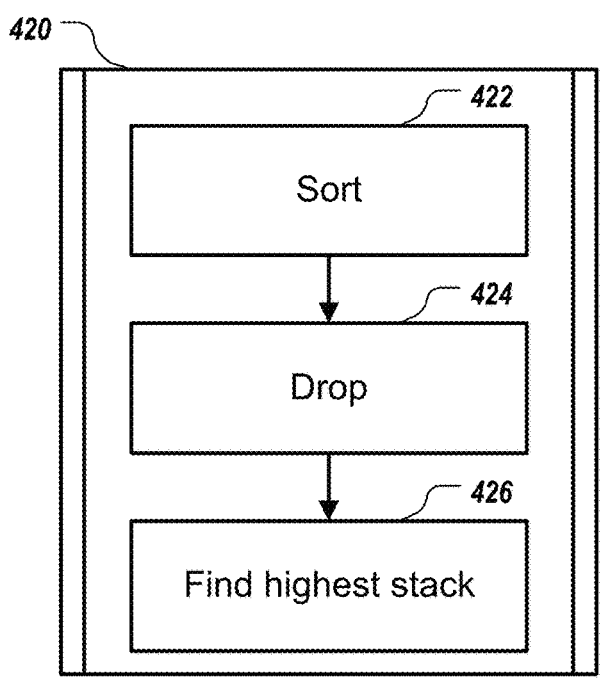

Once the set of tasks has been determined, each of the tasks is assigned (and potentially reassigned) to a robot of the system. FIGS. 4A-4B are flowcharts showing another example of a process to synchronize manufacturing activities of two or more robots in a shared build volume. FIGS. 5A-5I are diagrams that graphically show the example of the process of FIGS. 4A-4B to synchronize manufacturing activities of two or more robots. Note that FIGS. 5A-5I use the same X versus Time space discussed above, and each task is represented by its temporal dimension extent (height) and spatial dimension extent (width), but the spatial buffers are not separately shown.

An initial task assignment is performed 410. The set of tasks is sorted based on the spatial dimension and then divvied up among the queues for the available robots that can perform the tasks. In some implementations, the set of tasks is sorted according to their average spatial extent values (the X value halfway between the minimum and maximum X values), then the set of tasks is broken into sub-sets of roughly equal height (i.e., total duration of time to complete the tasks of the sub-set). For example, the values of the temporal dimension extents of the tasks in the full set can be added up to find the total time for all the tasks, then this number can be divided by the number of available robots for the tasks to determine an appropriate fraction of the total time. Tasks from the set can then be selected for a robot's queue from the top of the stack until adding another task would make the total duration of tasks assigned to that robot exceed the calculated fraction. Then tasks are selected from the set for the next robot in the same fashion, and so on, until all the tasks have been assigned to the robot queues.

Figure 5A:
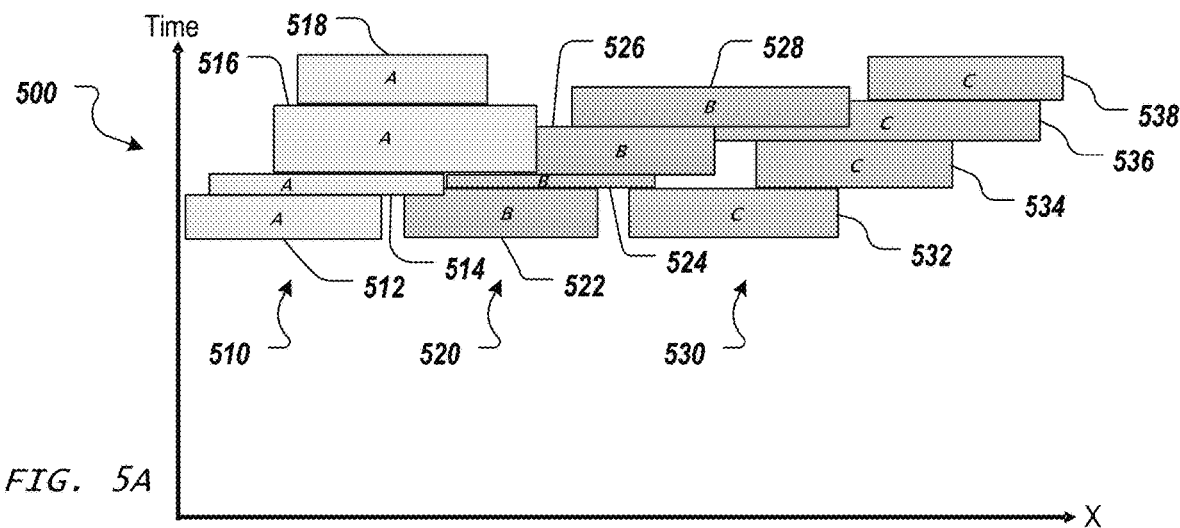
FIGS. 5A-5I are diagrams that graphically show the example of the process of FIGS. 4A-4B to synchronize manufacturing activities of two or more robots.

FIG. 5A shows an example 500 of X versus Time space with an initial assignment of tasks to three robots. A first robot queue 510 (for robot A) includes tasks 512, 514, 516, and 518. A second robot queue 520 (for robot B) includes tasks 522, 524, 526, and 528. A third robot queue 530 (for robot C) includes tasks 532, 534, 536, and 538. Note that the tasks within each queue currently have no wait times (space between tasks in the y direction, which corresponds to the Time dimension) and the tasks are generally sorted along the X dimension due to the initial sorting of all the tasks in the set, but the risk of collision in the X dimension has not yet been addressed, as shown by the overlap of tasks, such as the overlap in the X dimension of tasks 516 and 526, and the overlap in the X dimension of tasks 528 and 536.

In order to address this risk of collision, each of the robot queues is processed 420 to resolve any overlaps in the X dimension. The solve process 420 for the robot queues involves cross-checking the tasks in the various queues and includes adding wait times, as needed, to avoid collisions between the robots. In some implementations, solving 420 also includes sorting of the tasks within each queue in a robot dependent manner.

FIG. 4B shows an example of the solve process 420. Each robot queue is sorted 422 based on the position of that robot in the X dimension so as to create additional space between the robots in the X dimension when performing the tasks in their respective queues. For example, the leftmost robot's tasks are sorted by their maximum X value, the rightmost robot's tasks are sorted by their minimum X value, and the task for the other robot(s) in between the leftmost and rightmost robots are sorted by the average of their spatial dimension extent. Other sorting criteria can also be used, which can vary based on the number of robots in the system.

Figure 5B:
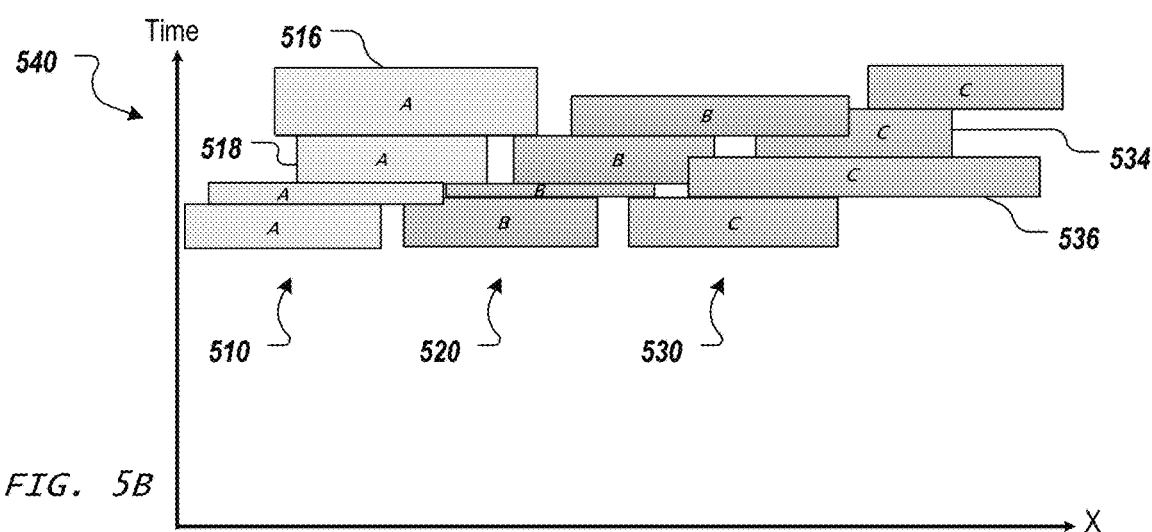

FIG. 5B shows an example 540 of X versus Time space for the tasks form FIG. 5A after the sorting for three robot queues. As shown, the first robot queue 510 has had tasks 516 and 518 swapped in time order due to their maximum X values, and the third robot queue 530 has had tasks 534 and 536 swapped in time order due to their minimum X values. However, the second robot queue 520 has remained the same since these tasks were already previously sorted according to the average of their minimum and maximum X values. Note that the left-to-right ordering in each of the queues 510, 520, 530 represents the sequence in which each robot A, B, C will perform its assigned tasks.

Figure 5C:
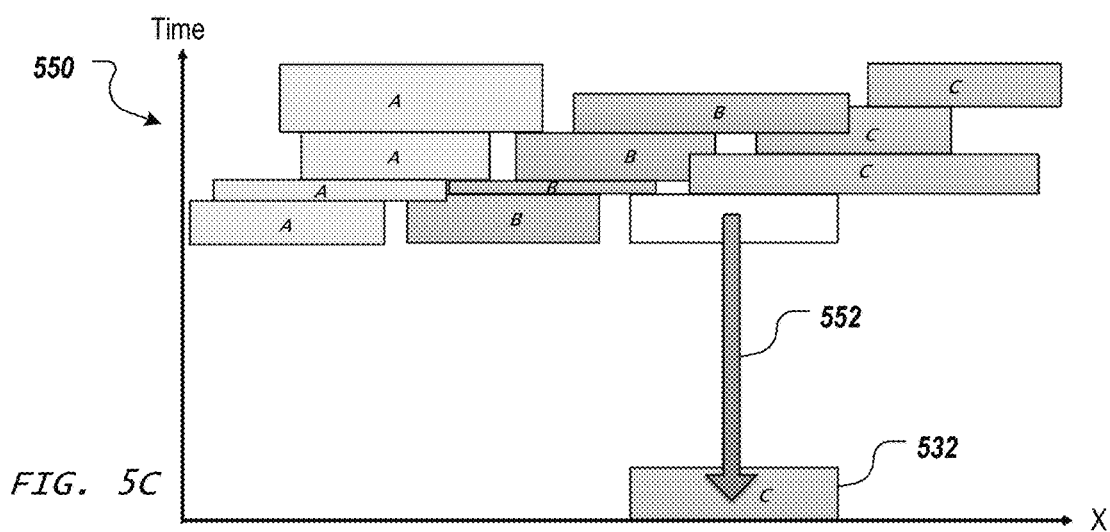
Figure 5D:
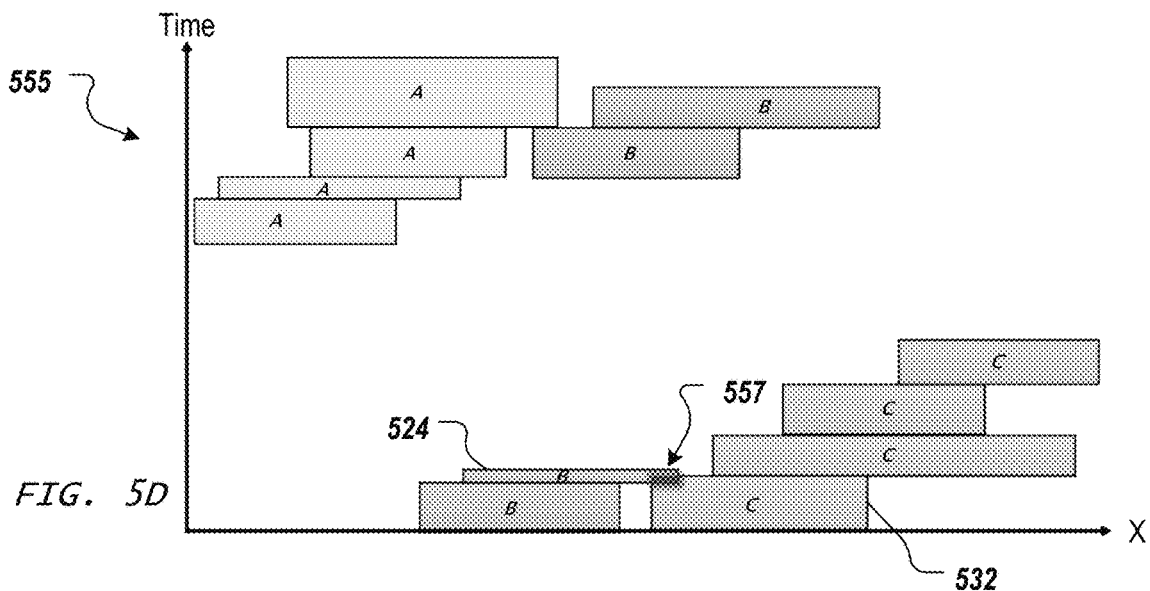

Once the tasks in the robot queues are sorted 422 in the X dimension, the tasks in the robot queues are then dropped 424 in the Time dimension to identify any potential collision conflicts. This is referred to as a "drop" within the context of the X versus Time space. FIG. 5C shows an example 550 of the X versus Time space with a task 532 having been dropped 552 down to time zero, i.e., the starting time for manufacturing the current layer of the 3D object. Starting with the rightmost robot, the timing of tasks is calculated. Each task is presumed to start immediately after the previous task by the same robot, unless it would collide with a task from a different robot. This can be understood graphically in FIGS. 5C and 5D like the dropping of Tetris pieces.

All of the rightmost robot's tasks can be dropped without having to add space in the Time dimension (wait time) since this robot's tasks are the first to be dropped to the actual timing for manufacture. In other words, since the process starts with the right-most robot and the tasks sweep left-to-right, there is no potential conflict (overlap in the X dimension) yet, and each of the tasks can start immediately after the previous one in the queue. However, as shown in the X versus Time space 555 of FIG. 5D, when the task 524 for robot B is dropped, it will conflict 557 with task 532 for robot C if task 524 immediately follows it previous task in the queue for robot B. While the conflict 557 does not mean the robots necessarily will collide, there is a risk of collision that should be avoided.

Figure 5E:
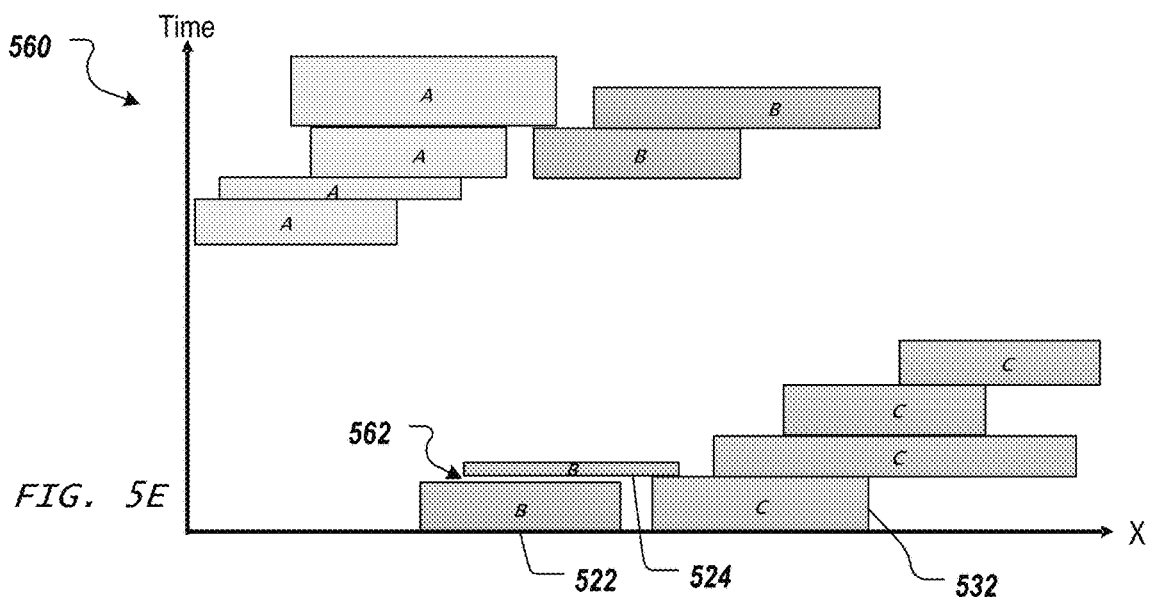

Thus, when performing the drop 424, wait time 562 is added between the tasks in the queue for robot B, as shown in the X versus Time space 560 of FIG. 5E. Instead of starting immediately after the first task 522, the second task 524 for robot B will have to wait until the task 532 from the rightmost bot is completed. This wait can be observed by the gap 562. In the visualization, if a rectangle representing a task is "stacked" on top of another, it indicates that the upper task is waiting for the lower task to be completed. These tasks can be from the same robot (as with the tasks for robot C), or can be from different bots (as with the task 524 stacked on the task 532). Thus, in dependency trees implementations, the drop 424 determines that the task 524 for robot B will depend on completion of task 532 by robot C, rather than on the completion of task 522 by robot B.

Figure 5F:
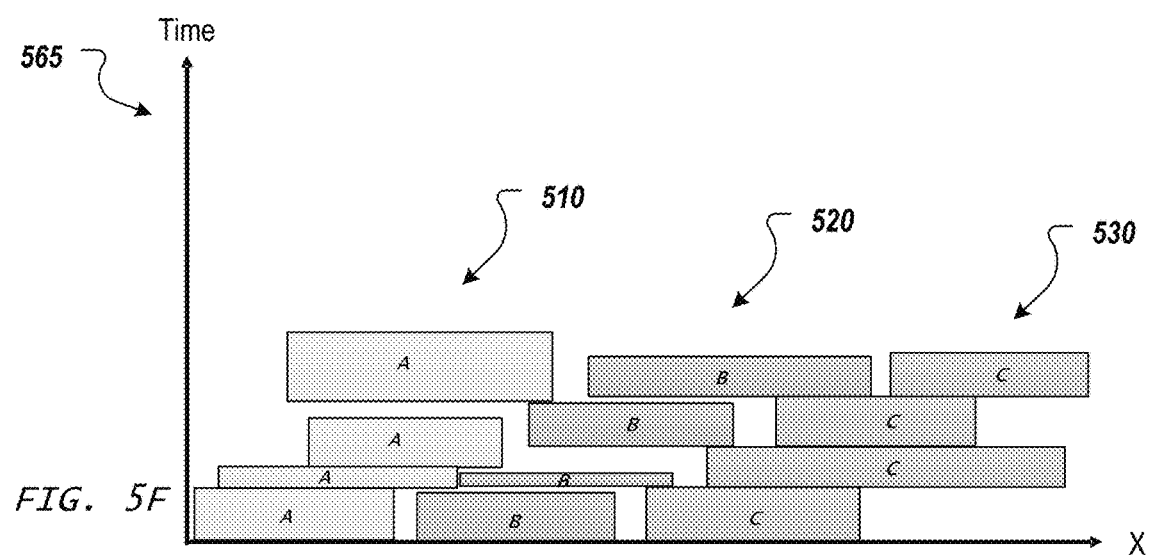
Figure 5G:
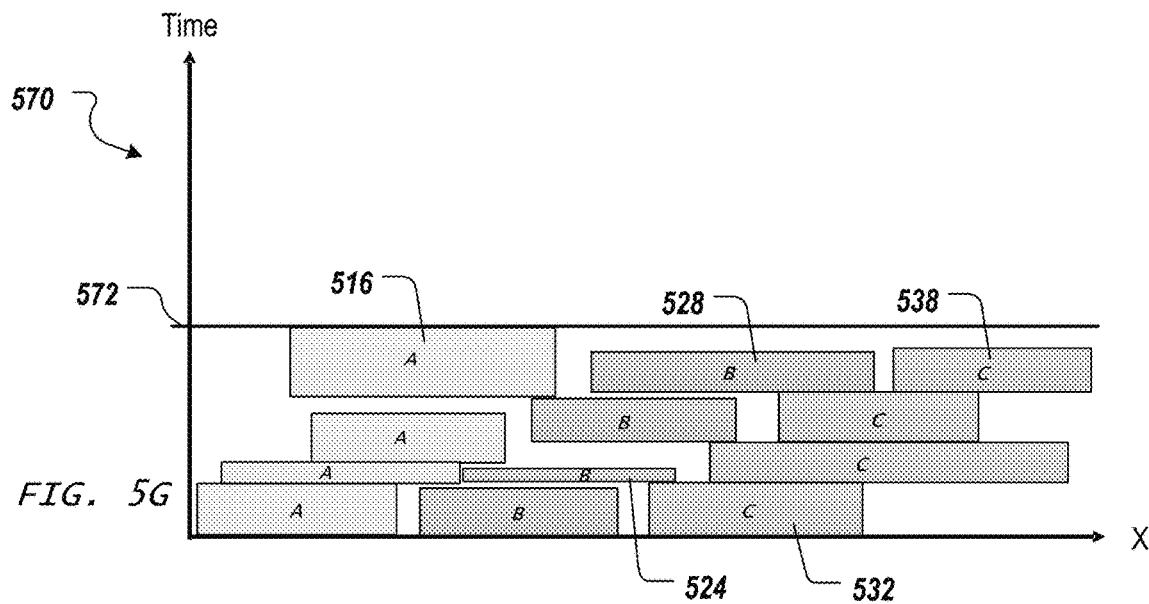

The drop 424 is performed for all the tasks in each of the robot task queues, moving from first-to-last task for each robot from right to left. In the example of FIGS. 5A-5I, the X versus Time space 565 of FIG. 5F shows the task queues 510, 520, 530 after the dropping 424 is completed. As shown, task queue 520 for robot B includes three wait times between tasks, and task queue 510 for robot A includes one wait time between tasks. Thus, the result is a collection of "stacks", where each stack is a set of tasks that depend on each other and potentially other tasks in the other stacks.

The highest stack is then found 426. Identifying the tallest stack means finding the chain of dependent tasks that finishes last. In the X versus Time space 565, the queue for robot A finishes last at time 572, as shown in X versus Time space 570 in FIG. 5G. In some implementations, finding the highest stack involves checking the amount of time (height) required for each robot queue with wait times included. Alternatively, the robot queues can be represented (at least in part) using dependency trees, where the wait times are implicit rather than explicit. For example, each task that starts at time zero is the root node of a dependency tree, and each such dependency tree can include tasks assigned to different robots. Thus, in FIG. 5G, task 532 can be a root node of a dependency tree, and each task in this tree immediately follows the task from which it depends, and the leaves of the tree are those tasks that have no further tasks dependent on them. Thus, for the dependency tree starting with task 532, the leaf nodes are tasks 524, 516, 528, and 538.

At this stage of processing, a fully detailed plan for conducting the activities of the robots, without risking collision, has been created. However, improvements to this plan may be possible, and thus an optimization process 430 is begun to try to find a more time efficient assignment of tasks. One or more variants of the task assignments are made 440. By reassigning tasks to create new cases, and then solving for these new cases, a better solution can be found, where the metric for "better" is a shorter total duration to manufacture the current layer of the 3D object. In some implementations, making 440 a variant of the task assignments involves one or both of the following for the tallest stack: (1) the highest leaf (last task in the dependency tree to finish) is reassigned to the next robot to the right, if available; and (2) the root is reassigned to the next robot to the left, if available.

The variant(s) of the task assignments is then solved 420 to find how long this new task assignment plan will take to complete. This process can be repeated until a check 450 determines that none of the variants are better than the last full task assignment plan completed. In some implementations, this is accomplished using recursive programming, where only a single variant is created 440 in each call of the optimization process 430, and as long as further time improvements are being realized, the optimization process 430 continues to be called again. Once a variant doesn't improve upon the last call, the optimization process 430 returns, and once all the calls to the optimization process 430 have returned, the task assignment optimization is done. Moreover, in some implementations, the recursive program 430 maintains a global list of attempted task assignment solutions and skips a recursive call for any variant that is already included in the global list of attempted task assignment solutions (i.e., a variant made 440 that is not new will cause the recursive program 430 to return rather than solve 420 again for the variant that has already been created).

Figure 5H:
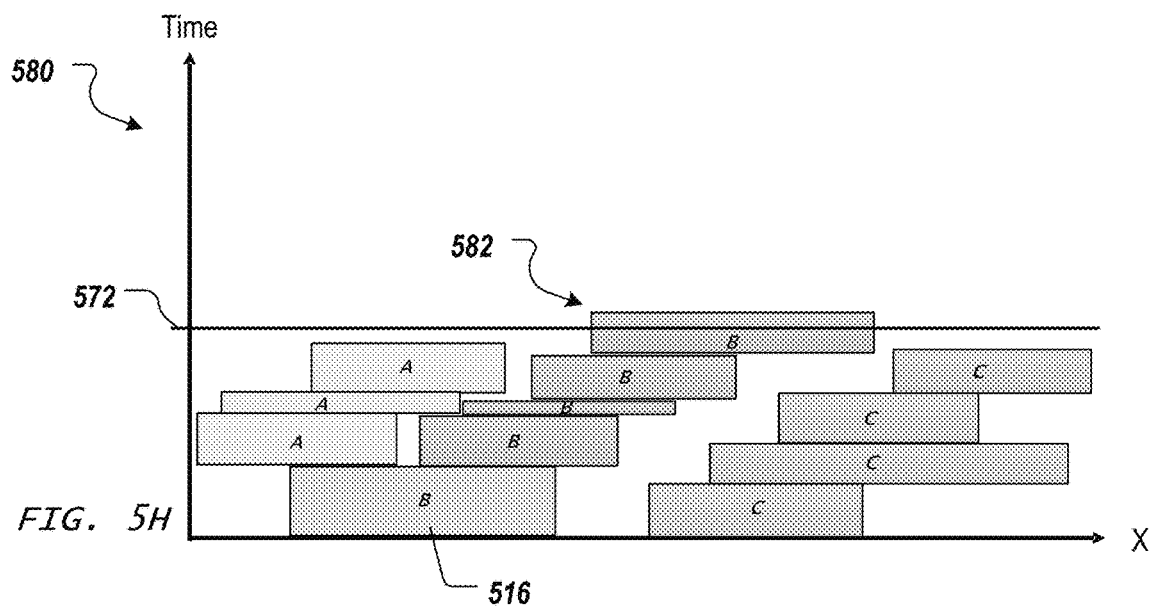

FIG. 5H shows an example 580 where a first variant is tried. The task 516 (e.g., the last leaf in the longest dependency tree of FIG. 5G) is moved from the queue for robot A to the queue for robot B. After solving 420 for this variant, the end time 582 of the last task is after the time 572 achieved previously. Thus, this task assignment variant is not better (it takes longer to complete all the tasks) and is discarded.

Figure 5I:
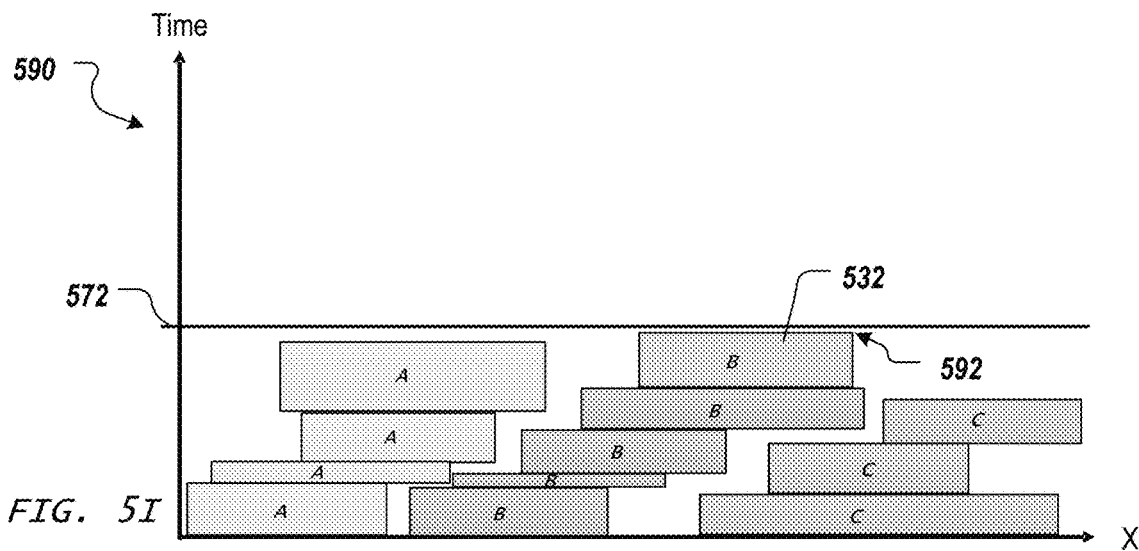

FIG. 5I shows an example 590 where a second variant is tried. The task 532 (e.g., the root of the longest dependency tree of FIG. 5G) is moved from the queue for robot C to the queue for robot B. After solving 420 for this variant, the end time 592 of the last task is before the time 572 achieved previously. Thus, this task assignment variant is better (it takes less time to complete all the tasks) and is kept.

As noted above, the set of steps to make variants and test them can be repeated recursively. Variants of any of those successful variants are made and tested as well, with any of their improved solutions continuing to be called recursively. Eventually, an optimal solution will be reached and none of the variants will be better than the original solution. At that point, the recursive function 430 calls will begin to return this optimal solution, which will trickle up the chain to be returned by the original call. Note that this recursive technique can lead to the same solution through multiple paths. To avoid redundant computation, a global list of solutions already attempted is stored. If a variant has already been tried in another branch of the recursive solution, it shouldn't be retried.

Figure 6:
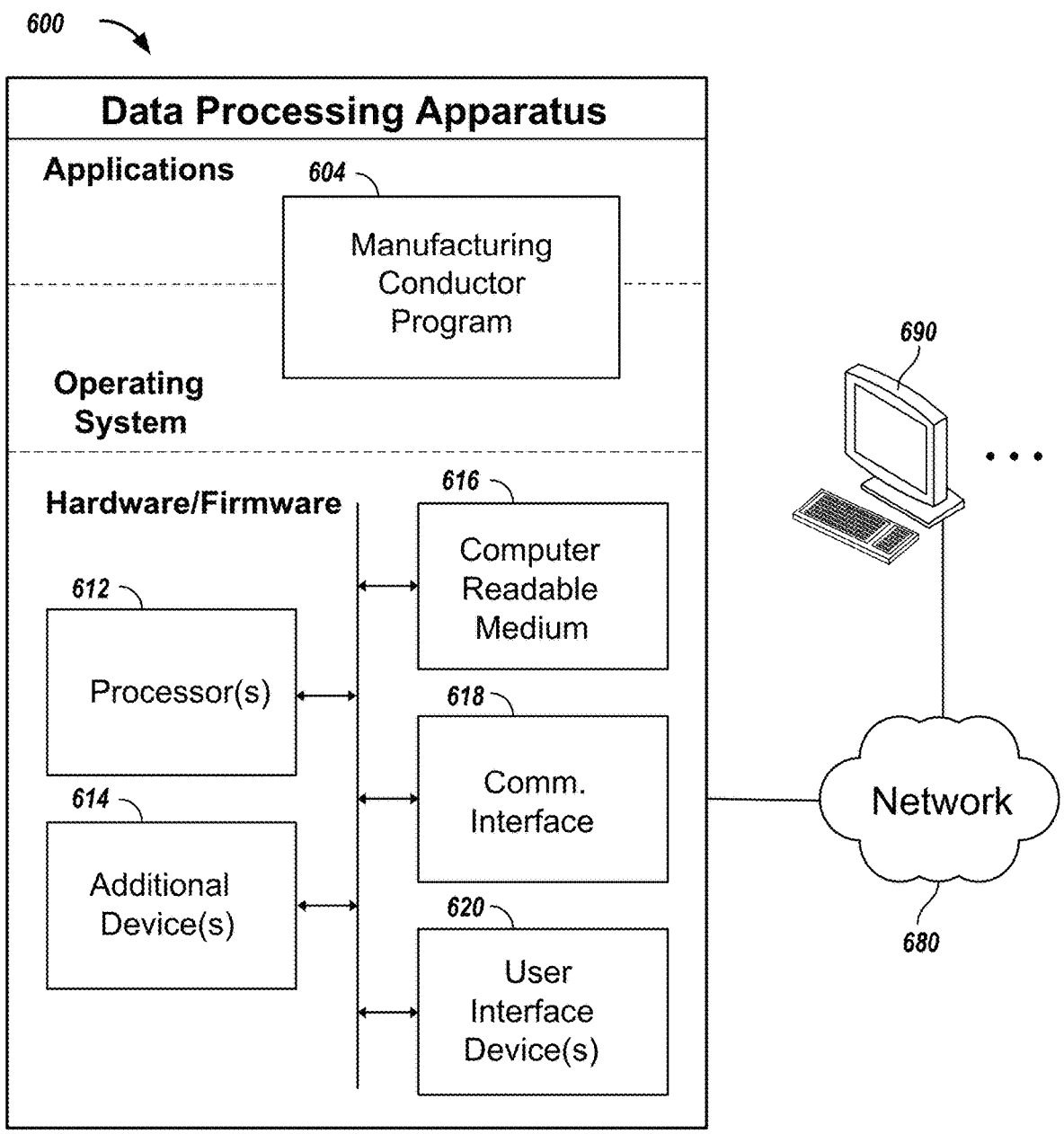
FIG. 6 is a schematic diagram of a data processing system including a data processing apparatus, which can be programmed to implement the processes of FIGS. 2-5I.

FIG. 6 is a schematic diagram of a data processing system including a data processing apparatus 600, which can be programmed as a client or as a server. The data processing apparatus 600 is connected with one or more computers 690 through a network 680. While only one computer is shown in FIG. 6 as the data processing apparatus 600, multiple computers can be used. The data processing apparatus 600 includes various software modules, which can be distributed between an applications layer and an operating system. These can include executable and/or interpretable software programs or libraries, including tools and services of a manufacturing conductor program 604, such as described above. The number of software modules used can vary from one implementation to another. Moreover, the software modules can be distributed on one or more data processing apparatus connected by one or more computer networks or other suitable communication networks.

The data processing apparatus 600 also includes hardware or firmware devices including one or more processors 612, one or more additional devices 614, a computer readable medium 616, a communication interface 618, and one or more user interface devices 620. Each processor 612 is capable of processing instructions for execution within the data processing apparatus 600. In some implementations, the processor 612 is a single or multi-threaded processor. Each processor 612 is capable of processing instructions stored on the computer readable medium 616 or on a storage device such as one of the additional devices 614. The data processing apparatus 600 uses its communication interface 618 to communicate with one or more computers 690, for example, over a network 680. Examples of user interface devices 620 include a display, a camera, a speaker, a microphone, a tactile feedback device, a keyboard, and a mouse. The data processing apparatus 600 can store instructions that implement operations associated with the modules described above, for example, on the computer readable medium 616 or one or more additional devices 614, for example, one or more of a floppy disk device, a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A computer-implemented method, comprising:
    determining a set of multiple tasks to be performed by two or more robots in a shared build volume to manufacture a three-dimensional (3D) object in the shared build volume, wherein each of the tasks in the set has a spatial dimension extent and a temporal dimension extent;
    assigning the tasks to respective queues of respective ones of the two or more robots, wherein each queue includes two or more assigned tasks;
    ordering the tasks within each queue of assigned tasks based on the spatial dimension extent;
    generating wait times within the queues of assigned tasks in accordance with timing dependencies among tasks in the queues of assigned tasks to avoid spatial overlap;
    identifying which of the queues of assigned tasks takes a most amount of time from among all of the respective queues of assigned tasks in accordance with the temporal dimension extents and the wait times;
    creating at least one variant of the queues of assigned tasks by moving a task in the identified queue, or a task on which a task in the identified queue depends, to another of the queues of assigned tasks;
    repeating the ordering, the generating, and the identifying to reduce a total time of manufacturing; and
    providing a finalized version of the queues of assigned tasks for conducting synchronized activities of the two or more robots when manufacturing the 3D object in the shared build volume.

2. The method of claim 1, wherein the two or more robots comprise 3D printer robots, and determining the set of multiple tasks comprises:
    obtaining a layer of a 3D model of the 3D object;
    identifying disconnected regions of the layer; and
    splitting at least one of the disconnected regions into smaller regions based on a spatial dimension of the at least one of the disconnected regions;
    wherein each of the tasks corresponds to manufacture of one of the smaller regions or an un-split one of the disconnected regions.

3. The method of claim 1, wherein the two or more robots comprise 3D printer robots, and determining the set of multiple tasks comprises:
    obtaining tool path specifications for a layer of a 3D model of the 3D object;
    identifying at least one of the tool path specifications that defines a tool path that spans a substantial portion of the shared build volume;
    splitting the at least one of the tool path specifications into smaller tool path specifications;
    wherein each of the tasks corresponds to one of the obtained tool path specifications or one of the smaller tool path specifications.

4. The method of claim 1, wherein determining the set of multiple tasks comprises, for each of the tasks:
    finding minimum and maximum coordinates of locations for manufacture of a portion of the 3D object represented by the task; and
    adding a buffer to the minimum and maximum coordinates of locations in accordance with a largest one of the robots that can carry out the task.

5. The method of claim 4, wherein assigning the tasks comprises:
    sorting the tasks by average values of their spatial dimension extents; and
    dividing the sorted tasks among the queues based on a number of the two or more robots and sums of the temporal dimension extents for the sorted tasks.

6. The method of claim 1, wherein ordering the tasks within each queue of assigned tasks comprises:
    sorting the tasks included in the queue for a leftmost robot of the two or more robots by maximum values of their spatial dimension extents; and
    sorting the tasks included in the queue for a rightmost robot of the two or more robots by minimum values of their spatial dimension extents.

7. The method of claim 6, comprising determining the timing dependencies among the tasks in the queues of assigned tasks by beginning with tasks assigned to the rightmost robot and proceeding in sequence through the queues of assigned tasks for the two or more robots, ending with tasks assigned to the leftmost robot.

8. The method of claim 1, wherein generating the wait times within the queues of assigned tasks comprises checking an end time of a temporal dimension extent for a first task in a first of the queues of assigned tasks when a spatial dimension extent of the first task overlaps with a spatial dimension extent of a second task in a second of the queues of assigned tasks.

9. The method of claim 8, wherein creating the at least one variant comprises:
    moving a final task from the queue of assigned tasks that takes the most amount of time to a queue of assigned tasks for a next robot over in a positive direction of the spatial dimension; and
    moving a root task in a dependency tree, which includes the final task, to a queue of assigned tasks for a next robot over in a negative direction of the spatial dimension.

10. The method of claim 1, wherein the creating and the repeating are performed by a recursive program.

11. The method of claim 10, wherein the recursive program maintains a global list of attempted task assignment solutions and skips a recursive call for any variant that is already included in the global list of attempted task assignment solutions.

12. A non-transitory computer-readable medium encoding instructions programmed to cause one or more hardware processors of one or more computing devices to perform operations comprising:
    determining a set of multiple tasks to be performed by two or more robots in a shared build volume to manufacture a three-dimensional (3D) object in the shared build volume, wherein each of the tasks in the set has a spatial dimension extent and a temporal dimension extent;

assigning the tasks to respective queues of respective ones of the two or more robots, wherein each queue includes two or more assigned tasks;

ordering the tasks within each queue of assigned tasks based on the spatial dimension extent;

generating wait times within the queues of assigned tasks in accordance with timing dependencies among tasks in the queues of assigned tasks to avoid spatial overlap;

identifying which of the queues of assigned tasks takes a most amount of time from among all of the respective queues of assigned tasks in accordance with the temporal dimension extents and the wait times;

creating at least one variant of the queues of assigned tasks by moving a task in the identified queue, or a task on which a task in the identified queue depends, to another of the queues of assigned tasks;

repeating the ordering, the generating, and the identifying to reduce a total time of manufacturing; and providing a finalized version of the queues of assigned tasks for conducting synchronized activities of the two or more robots when manufacturing the 3D object in the shared build volume.

13. The non-transitory computer-readable medium of claim 12, wherein the two or more robots comprise 3D printer robots, and determining the set of multiple tasks comprises:

obtaining a layer of a 3D model of the 3D object;

identifying disconnected regions of the layer; and splitting at least one of the disconnected regions into smaller regions based on a spatial dimension of the at least one of the disconnected regions;

wherein each of the tasks corresponds to manufacture of one of the smaller regions or an un-split one of the disconnected regions.

14. The non-transitory computer-readable medium of claim 12, wherein the two or more robots comprise 3D printer robots, and determining the set of multiple tasks comprises:

obtaining tool path specifications for a layer of a 3D model of the 3D object;

identifying at least one of the tool path specifications that defines a tool path that spans a substantial portion of the shared build volume;

splitting the at least one of the tool path specifications into smaller tool path specifications;

wherein each of the tasks corresponds to one of the obtained tool path specifications or one of the smaller tool path specifications.

15. The non-transitory computer-readable medium of claim 12, wherein determining the set of multiple tasks comprises, for each of the tasks:

finding minimum and maximum coordinates of locations for manufacture of a portion of the 3D object represented by the task; and adding a buffer to the minimum and maximum coordinates of locations in accordance with a largest one of the robots that can carry out the task.

16. The non-transitory computer-readable medium of claim 15, wherein assigning the tasks comprises:

sorting the tasks by average values of their spatial dimension extents; and dividing the sorted tasks among the queues based on a number of the two or more robots and sums of the temporal dimension extents for the sorted tasks.

17. The non-transitory computer-readable medium of claim 12, wherein ordering the tasks within each queue of assigned tasks comprises:

sorting the tasks included in the queue for a leftmost robot of the two or more robots by maximum values of their spatial dimension extents; and sorting the tasks included in the queue for a rightmost robot of the two or more robots by minimum values of their spatial dimension extents.

18. The non-transitory computer-readable medium of claim 17, wherein the operations comprise determining the timing dependencies among the tasks in the queues of assigned tasks by beginning with tasks assigned to the rightmost robot and proceeding in sequence through the queues of assigned tasks for the two or more robots, ending with tasks assigned to the leftmost robot.

19. The non-transitory computer-readable medium of claim 12, wherein generating the wait times within the queues of assigned tasks comprises checking an end time of a temporal dimension extent for a first task in a first of the queues of assigned tasks when a spatial dimension extent of the first task overlaps with a spatial dimension extent of a second task in a second of the queues of assigned tasks.

20. The non-transitory computer-readable medium of claim 19, wherein creating the at least one variant comprises:

moving a final task from the queue of assigned tasks that takes the most amount of time to a queue of assigned tasks for a next robot over in a positive direction of the spatial dimension; and moving a root task in a dependency tree, which includes the final task, to a queue of assigned tasks for a next robot over in a negative direction of the spatial dimension.

21. The non-transitory computer-readable medium of claim 12, wherein the creating and the repeating are performed by a recursive program.

22. The non-transitory computer-readable medium of claim 21, wherein the recursive program maintains a global list of attempted task assignment solutions and skips a recursive call for any variant that is already included in the global list of attempted task assignment solutions.

23. A system comprising:

two or more robots configured and arranged to perform manufacturing operations in a shared build volume;

a non-transitory storage medium having instructions of a manufacturing conductor program stored thereon; and one or more hardware processors configured to run the instructions of the manufacturing conductor program to determine a set of multiple tasks to be performed by the two or more robots in the shared build volume to manufacture a three-dimensional (3D) object in the shared build volume, wherein each of the tasks in the set has a spatial dimension extent and a temporal dimension extent, assign the tasks to respective queues of respective ones of the two or more robots, wherein each queue includes two or more assigned tasks, order the tasks within each queue of assigned tasks based on the spatial dimension extent, generate wait times within the queues of assigned tasks in accordance with timing dependencies among tasks in the queues of assigned tasks to avoid spatial overlap, identify which of the queues of assigned tasks takes a most amount of time from among all of the respective queues of assigned tasks in accordance with the temporal dimension extents and the wait times, create at least one variant of the queues of assigned tasks by moving a task in the identified queue, or a task on which a task in the identified queue depends, to another of the queues of assigned tasks, repeat the ordering of tasks, the generating of wait times, and the identifying of a queue to reduce a total time of manufacturing, and provide a finalized version of the queues of assigned tasks for conducting synchronized activities of the two or more robots when manufacturing the 3D object in the shared build volume.

24. The system of claim 23, wherein the two or more robots comprise two or more additive manufacturing tools, and the one or more hardware processors are configured to run the instructions of the manufacturing conductor program to provide the finalized version of the queues of assigned tasks by outputting tool path specifications to cause the two or more additive manufacturing tools to additively manufacture the 3D object in the shared build volume without collision among the two or more robots.

* * * * *